United States Patent
Arandes Vilagrasa et al.

(10) Patent No.: US 12,534,340 B2
(45) Date of Patent: Jan. 27, 2026

(54) METHOD AND DEVICE FOR DETERMINING ESTIMATED REAL DIMENSIONS OF AN ELEVATOR CAR

(71) Applicant: Inventio AG, Hergiswil (CH)

(72) Inventors: Roc Arandes Vilagrasa, El Palau d''Anglesola (ES); Alberto Chiappa, Saint-Sulpice (CH); Xavier Guidetti, Echandens (CH); Martin Kusserow, Lucerne (CH); Maxim Pavliv, Grandvaux (CH); Louis-Dominique Renaud, Paris (FR)

(*) Notice: Subject to any disclaimer, the term of this patent is extended or adjusted under 35 U.S.C. 154(b) by 789 days.

(21) Appl. No.: 17/759,521

(22) PCT Filed: Feb. 1, 2021

(86) PCT No.: PCT/EP2021/052240
§ 371 (c)(1),
(2) Date: Jul. 27, 2022

(87) PCT Pub. No.: WO2021/156168
PCT Pub. Date: Aug. 12, 2021

(65) Prior Publication Data
US 2023/0089074 A1    Mar. 23, 2023

(30) Foreign Application Priority Data
Feb. 6, 2020 (EP) .................................. 20155774

(51) Int. Cl.
*B66B 5/00* (2006.01)
*B25J 19/02* (2006.01)
*G01S 17/89* (2020.01)

(52) U.S. Cl.
CPC ........... *B66B 5/0087* (2013.01); *B25J 19/022* (2013.01); *G01S 17/89* (2013.01)

(58) Field of Classification Search
CPC ....... B66B 5/0087; B25J 19/022; G01S 17/89
(Continued)

(56) References Cited

U.S. PATENT DOCUMENTS

| 2014/0301633 A1* | 10/2014 | Furukawa | G06T 17/00 |
|---|---|---|---|
| | | | 382/154 |
| 2020/0011995 A1* | 1/2020 | Send | G01S 3/783 |
| 2022/0164493 A1* | 5/2022 | Li | G06V 20/36 |

FOREIGN PATENT DOCUMENTS

CN     207908967 U  *  9/2018

OTHER PUBLICATIONS

Yang, S. et al. "On Solving Mirror Reflection in LIDAR Sending" ASME Transactions on Mechatronics, IEEE Service Center, Piscataway, NJ, US, vol. 16, No. 2, Apr. 1, 2011, pp. 255-265, XP011342275, ISN: 1083-4435, DOI: 10.1109/TMECH.2010.2040113 abstract.

* cited by examiner

*Primary Examiner* — Kawing Chan
(74) *Attorney, Agent, or Firm* — Schlee IP International, PC; Alexander R. Schlee; Pascal A. Schlee (57) ABSTRACT

A method for determining estimated real dimensions of an elevator car by: acquiring a virtual 2-dimensional map of the car based on data provided by a lidar sensor, the map representing reflection surfaces from which laser light emitted by the sensor is reflected; defining a rectangular starting area at a position located within the real dimensions of the car; successively extending the area by one pixel in each of four extension directions orthogonal to edges of the area, and when any pixel in one of the extension directions corresponds to one of the reflection surfaces in the map, stopping extending the area in this extension direction and successively extending the area by one pixel in each of the remaining extension directions the area is extended to a maximum in all the extension directions; and determining (Continued)

5 MAPPING ROBOT
7 ELEVATOR CAR
11 MIRROR
19 LASER SOURCE
23 DETECTOR
29 COMPUTING UNIT the fully extended rectangular area as the estimated real dimensions of the car.

14 Claims, 3 Drawing Sheets

(58) Field of Classification Search
USPC .......................................................... 187/393
See application file for complete search history.

Fig. 1

5 MAPPING ROBOT
7 ELEVATOR CAR
11 MIRROR
19 LASER SOURCE
23 DETECTOR
29 COMPUTING UNIT

METHOD AND DEVICE FOR DETERMINING ESTIMATED REAL DIMENSIONS OF AN ELEVATOR CAR

FIELD

The present invention relates to a method and a device for determining estimated real dimensions of an elevator car. Furthermore, the invention relates to a maintenance arrangement to be applied in maintaining an elevator. Finally, the invention relates to a computer program product configured for implementing the proposed method and to a computer readable medium having stored thereon such computer program product.

BACKGROUND

CN 207908967 U discloses a method and a computing device for determining estimated real dimensions of an elevator car using a laser radar device used in an automated guided vehicle.

In an elevator, an elevator car may be displaced between various levels for transporting passengers and/or goods for example between different floors in a building. The elevator is generally configured for implementing various functions. Such functions may relate to a normal operation of the elevator and may include for example controlling intended displacements of the elevator car, controlling precise stopping of the elevator car at floors, providing information to passengers, etc. Other functions may relate to an emergency operation and may include for example controlling emergency actions such as activating emergency brakes of the elevator car, arranging for emergency help and maintenance, etc. Further functions may relate to regular maintenance of the elevator.

All functions of an elevator may have to be tested before normal operation of the elevator is actually started. Conventionally, a specialized maintenance technician may have to perform such tests. Such tests may include for example intentionally displacing the elevator car to various positions using various control mechanisms such as activating landing operation panels at various floors and/or activating a car operation panel in the elevator car. For such purpose, the technician may have to spend a lot of time and efforts e.g. for travelling throughout the building using the elevator.

In order to reduce efforts and time for such tests, novel approaches are currently developed in which at least some of the tests may be performed by machines such as robots. For example, robots may be configured for travelling throughout a building using the elevator. The robot may test functions of the elevator e.g. by performing actions which, during later normal operation or maintenance, will be performed by passengers or by a technician. Therein, a robot may have to enter and exit the elevator car at various floors, activate landing operation panels and/or car operation panels, etc.

For such purpose, the robot may have to be able to autonomously navigate throughout the building and its elevator. Accordingly, the robot may require some information about its environment. Particularly, the robot may require information about positions and dimensions of floors, elevator doors, elevator cars, etc.

Particularly, it has been observed that, for the robot being able to use the elevator and check its functions, the robot may require precise information about the dimensions of the elevator car. Such information may be needed for enabling the robot to move throughout the elevator car. Particularly, such information may help the robot to move to positions within the elevator car where the robot does e.g. not disturb human passengers in the elevator car, i.e. to "behave" in a "social" manner. For example, the robot may move to a position at a wall or in a corner of the elevator car instead of standing right in the middle of the elevator car or even blocking an entry/exit area of the elevator car.

For enabling the robot to navigate throughout the building and its elevator, the robot may comprise one or more sensors. Particularly, robots may comprise a lidar system comprising a lidar sensor for determining information about its environment. "Lidar" stands for light detection and ranging. Generally, lidar is an optical technique in which light is emitted and is then detected upon being reflected at a target. Particularly, lidar is a surveying method that may measure distances to a target by illuminating the target with laser light and measure the reflected light with a sensor. Additionally, the robot may comprise other types of sensors such as ultrasonic sensors, mechanical sensors, etc. as well as actuators e.g. for activating elevator functions.

However, upon detecting the environment using the lidar system, erroneous observations may occur at least under some conditions. For example, it has been observed that upon using its lidar system, a robot may have problems in determining dimensions of an elevator car correctly.

Accordingly, there may be a need for a method and a computing device for determining real dimensions of an elevator car in a reliable and/or precise manner. Furthermore, there may be a need for a maintenance arrangement applying such method and computing device as well as for a computer program product implementing the method and a computer readable medium storing the computer program product.

SUMMARY

Such needs may be met with the subject-matter of the advantageous embodiments that are defined in the following specification.

According to a first aspect of the present invention, a method for determining estimated real dimensions of an elevator car is proposed. The method comprises at least the following steps, preferably in the indicated order:
(a) acquiring a virtual 2-dimensional map of the elevator car based on data provided by a lidar sensor, the virtual 2-dimensional map representing reflection surfaces from which laser light emitted by the lidar sensor is reflected,
(b) defining a starting area as a rectangular area at a position located within the real dimensions of the elevator car,
(c) successively extending the rectangular area by one pixel in each of four extension directions orthogonal to edges of the rectangular area, including, in case any pixel in one of the extension directions corresponds to one of the reflection surfaces indicated in the virtual 2-dimensional map, stopping extending the rectangular area in this direction and successively extending the rectangular area by one pixel only in each of the remaining extension directions, until having fully extended the rectangular area to a maximum in each of the extension directions, and
(d) determining the fully extended rectangular area as the estimated real dimensions of the elevator car.

According to a second aspect of the invention, a computing device for determining estimated real dimensions of an elevator car is proposed. The computing device is configured for executing the method according to an embodiment of the first aspect of the invention.

According to a third aspect of the invention, a maintenance arrangement for providing support in maintaining an elevator arrangement is proposed. The maintenance arrangement comprises a mapping robot and a computing device according to an embodiment of the second aspect of the invention. The mapping robot comprises a mobilization unit and a lidar sensor. The robot is configured for traveling along an accessible space driven by the mobilization unit and for acquiring a virtual 2-dimensional map of a surrounding of the robot using the lidar sensor. Therein, the computing device is configured for determining estimated real dimensions of an elevator car based on a virtual 2-dimensional map of the elevator car acquired with the lidar sensor of the robot.

According to a fourth aspect of the invention, a computer program product is proposed. The computer program product comprises computer readable instructions instructing a processor for executing or controlling the method according to an embodiment of the first aspect of the invention.

Finally, according to a fifth aspect of the invention, a computer readable medium having stored thereon the computer program product according to an embodiment of the fourth aspect of the invention is proposed.

Ideas underlying embodiments of the present invention may be interpreted as being based, inter alia, on the following observations and recognitions.

As already briefly indicated further above, lidar systems sometimes provide erroneous or imprecise results upon detecting their environment. This particularly applies in cases where mirrors are present in the environment. The mirrors generate a mirrored representation of the environment which may disturb the lidar system.

Particularly, a lidar system used by a robot for determining the environment in an elevator arrangement may be disturbed by mirrors which in many cases cover part of walls in an elevator car. Accordingly, based on the information provided by the lidar system, the robot may assume that estimated dimensions of the elevator car are larger than they are in reality.

In order to overcome such erroneous or imprecise detection and analysis of an environment based on lidar signals, a specific approach is proposed herein. Such an approach is particularly applicable for determining estimated real dimensions of an elevator car as it may benefit from specific preconditions and/or assumptions applicable for such elevator cars. For example, it may generally be assumed that the elevator car has a substantially rectangular horizontal cross-section (sometimes also referred to as footprint). Furthermore, it may generally be assumed that mirrors only cover partial areas of entire walls within the elevator car while some other areas remaining non-mirrored. For example, a mirror may be surrounded by a non-mirrored area or may be held by a non-mirroring frame.

The method for determining estimated real dimensions of an elevator car as proposed herein starts with acquiring a virtual 2-dimensional map of the elevator car based on data provided by a lidar sensor. Such 2-dimensional map may be acquired by the lidar sensor upon emitting a laser beam along a single plane, particularly along a horizontal plane. For example, a laser beam may be emitted by a laser source. Such laser beam may then be deflected into a direction included in the horizontal plane using for example a mirror. The mirror may be rotated such that the laser beam is deflected in all directions along the horizontal plane, i.e. the laser beam is successively deflected in 360° within the horizontal plane. Upon being reflected at a target, reflections of the laser beam may be detected in the lidar sensor. By analyzing such reflections, particularly by analyzing a time of flight (TOF) between emitting the laser beam and detecting the reflection, information about a distance of the target with respect to the lidar sensor may be acquired. Based on such information, the virtual 2-dimensional map of the lidar sensor's environment may be generated. In case of the lidar sensor being located within an elevator car, such 2-dimensional map represents reflection surfaces from which laser light emitted by the lidar sensor is reflected. Such reflection surfaces generally correspond to surfaces of the vertical walls of the elevator car.

However, in cases where at least one of these walls is partially covered by a mirror, the lidar sensor generally does not detect its distance to this wall, but, as the mirror reflects an image of an opposite wall of the elevator car, the lidar sensor may detect an erroneous distance with regard to the reflected wall.

Accordingly, in order to acquire reliable information about the real dimensions of the elevator car, the method proposed herein continues with specifically analyzing the acquired virtual 2-dimensional map.

In the algorithm proposed for such purpose, first, a starting area is defined. The starting area may correspond to a single pixel in an image representing the virtual 2-dimensional map. In other words, the starting area may be the smallest area for which information may be provided within the virtual 2-dimensional map. Such pixel or starting area generally is or may be interpreted as being rectangular.

For the algorithm proposed herein being successful, the starting area should be defined at a position within the real dimensions of the elevator car. In other words, the starting area should not be defined within a virtual space generated upon reflecting walls of the elevator car in a mirror covering one of these walls, such virtual space being outside the real footprint of the elevator car. Instead, the starting area should be defined somewhere within the real dimensions of the elevator car, i.e. within the real footprint of the elevator car.

In order to be sure that the starting area is defined within the real dimensions of the elevator car, this starting area may be defined based on prior knowledge data indicating additional information about the real dimensions of the elevator car.

In other words, upon defining the position of the starting area, other sources of information about the real dimensions of the elevator car may be used. Generally, such additional information is not included in, or analytically derivable from, the virtual 2-dimensional map itself. For example, the prior knowledge data indicating such additional information may be acquired from a map or plan representing a layout or footprint of the building in which the elevator is situated. Using such layout or footprint, it may be estimated where the elevator car is situated and where its real dimensions roughly end. Accordingly, the starting area may be defined within such estimated real dimensions of the elevator car.

For example, a human technician may determine the position of the starting area based on prior knowledge data and/or based on other criteria. The technician may then input the information about such position into a computing device configured for executing other steps of the method proposed herein.

Alternatively, the computing device itself may implement an algorithm with which prior knowledge data may be analyzed such that the starting area may be positioned within the real dimensions of the elevator car. For example, the computing device may use image analysis for analyzing a map or plan representing the layout or footprint of the building accommodating the elevator for determining a location within the real dimensions of the elevator car.

Preferably, the starting area may be defined at or close (adjacent) to a geometric center of the elevator car.

In other words, the starting area should preferably not be defined at or close to one of the walls surrounding an interior space of the elevator car but should be defined sufficiently remote from such walls. Accordingly, the starting area should be defined sufficiently remote from any mirror covering a part of such wall. In this context, "at or close to a geometric center of the elevator car" may be interpreted as being closer to the geometric center of the elevator car than to one of the walls. By defining the starting area to be at or close to such geometric center, a probability of receiving a correct result for the estimated real dimensions of the elevator car using the proposed method may be increased.

Furthermore, preferably, the starting area should be defined with edges of the rectangular area being parallel to walls of the elevator car.

Expressed differently, the starting area having itself a rectangular geometry should preferably be oriented such that its edges are parallel to the walls of the elevator car also having a rectangular geometry. Preferably, a misalignment of such parallel arrangement should be smaller than 20°, more preferably smaller than 10° or even smaller than 5°. With the starting area having such orientation, i.e. being aligned with the geometry of the elevator car, a probability of receiving a correct result for the estimated real dimensions of the elevator car using the proposed method may be increased.

Upon having defined the starting area, in next steps of the proposed method, the rectangular area of the starting area is successively extended by one pixel in each of four extension directions. Therein, each extension direction is orthogonal to one of the edges of the rectangular starting area. In other words, while the starting area may be a single pixel within the virtual 2-dimensional map of the elevator car, in a first step, the rectangle defining the starting area is extended in each extension direction such as to include one pixel above, one pixel below, one pixel to the left and one pixel to the right with regard to the initial pixel defining the starting area. Furthermore, in order to keep the extended area rectangular, the entire extended area of the rectangle includes corner pixels connecting the mentioned extended pixels. Expressed differently, the edges of the rectangular starting area are displaced in a parallel manner by the width of one pixel in each of the four extension directions.

Such extending of the rectangular area may be repeated several times. Particularly, the described extending of the rectangular area in all extension directions may be repeated until at least one of the edges of the rectangular area reaches one of the reflection surfaces indicated in the virtual 2-dimensional map.

Accordingly, in case any pixel in one of the extension directions corresponds to one of the reflection surfaces indicated in the virtual 2-dimensional map, extending the rectangular area in this direction should be stopped, i.e. should not be executed in subsequent steps of extending the rectangular area. Instead, in such subsequent steps, the rectangular area should only be extended by one pixel in each of the remaining extension directions.

The entire procedure of successively extending the rectangular area therefore generally begins with extending the rectangular area in all four extension directions until such extending is "blocked" in at least one of the extension directions by the extended rectangular area reaching one of the reflection surfaces representing walls, i.e. lateral limits, of the elevator car. The rectangular area is then successively further extended in the remaining extension directions until also these extending actions are sooner or later "blocked" upon reaching other ones of the reflection surfaces representing one of the other walls of the elevator car.

Finally, the rectangular area is fully extended to a maximum in each of the extension directions. Such fully extended rectangular area then represents the estimated real dimensions of the elevator car to be determined in the proposed method.

The proposed method allows determining the estimated real dimensions of the elevator car with high precision. In fact, the fully extended rectangular obtained upon extending the initial starting area in each of four extension directions to a maximum generally corresponds to a high degree to the exact real dimensions of the elevator car.

Results of the proposed method are particularly reliable as long as some preconditions and/or assumptions apply. Particularly, it is generally necessary that the starting area is selected such that its position is inside the real dimensions of the elevator car. Furthermore, it may be helpful that the starting area is positioned at a suitable starting location, preferably sufficiently far away from a mirrored wall of the elevator car, and or that the orientation of the rectangular starting area is aligned with the generally rectangular footprint of the elevator car.

However, in some cases and/or with some starting conditions, the proposed algorithm may sometimes not provide correct results. For example, in case the location of the starting area is not set sufficiently distant from a mirrored wall of the elevator car, the algorithm may result in areas represented within the virtual 2-dimensional map and being actually outside the real dimensions of the elevator car being erroneously interpreted as being part of real dimensions of the elevator car.

In order to overcome such deficiency, the method proposed herein may be further amended. Particularly, according to an embodiment, steps (b) to (c) of the proposed method may be repeated in iterations with defining the starting area in step (b) at various positions located within the real dimensions of the elevator car.

In other words, it may be helpful, in obtaining reliable results indicating the estimated real dimensions of the elevator car, to not only successively extending the initial starting area once until having fully extended this rectangular area, but to repeat this procedure several times, i.e. in several iterations, while changing the respective starting positions of the starting area. Accordingly, the finally resulting fully extended rectangular area is developed from different initial starting areas which at least differ with respect to their position within the real dimensions of the elevator car.

Particularly, it may be helpful to, in each of such subsequent iterations, defining the starting area at a position located within the fully extended rectangular determined in a first iteration.

Expressed differently, in a first iteration, the starting area may be successively extended until reaching the fully extended rectangular area. In one or more subsequent iterations, the location of the starting area may then be set such that it is located within this fully extended rectangular area of the first iteration. In this way, a likelihood of a final result of the proposed method being correct may be increased.

Particularly, according to an embodiment, in step (d) of the proposed method, in case all iterations result in a same fully extended rectangular area, such fully extended rectangular area may be determined as representing the estimated real dimensions of the elevator car.

In other words, in case several starting areas are set at different positions and are extended to the fully extended rectangular area in each of multiple successive iterations, in a best-case scenario, all iterations result in a same fully extended rectangular area. Expressed differently, all iterations converge to result in a same fully extended rectangular area. In such case, the resulting fully extended rectangular area represents with a very high probability the real dimensions of the elevator car to be determined.

According to an alternative embodiment, in step (d) of the proposed method, in case the iterations result in differing fully extended rectangular areas, a most-likely solution may be selected among the differing fully extended rectangular areas taking into account additional prior knowledge and the most-likely solution may be determined as the estimated real dimensions of the elevator car.

In other words, in a scenario where different iterations in the proposed method do not result in a same fully extended rectangular area, a most-likely solution among the differing resulting fully extended rectangular areas may be selected by taking into account further information. Such further information may be prior knowledge which relates for example to typical geometries of the elevator cars, typical artifacts included in virtual 2-dimensional maps acquired based on lidar data, etc. For example, in case the different iterations result in fully extended rectangular areas having different rectangular geometries, the most-likely solution may be selected based on a most reasonable aspect ratio in such rectangular geometry and/or a most reasonable size of the rectangular geometry.

Furthermore, according to a further specified embodiment, each of multiple determined fully extended areas not including the starting area defined in the first iteration may be disregarded upon the determining the estimated real dimensions of the elevator car.

This may mean that at least for the first iteration, the position of the starting area is known to be located within the real dimensions of the elevator car. In case the fully extended rectangular area obtained in one of subsequent iterations in the proposed method does not include this position, this fully extended rectangular area apparently does not represent the entire real dimensions of the elevator car but, instead, either represents only a part of this entire real dimensions or is even at least partially located within a mirrored portion of the virtual 2-dimensional map of the elevator car. Accordingly, such fully extended rectangular area may be disregarded upon finding the real dimensions of the elevator car.

An embodiment of the computing device according to the second aspect of the invention may comprise a processor for processing computer readable instructions and a memory for storing such computer readable instructions and/or for storing data to be processed. Furthermore, the computing device may comprise interfaces or data communication lines via which data and/or signals may be exchanged with other devices such as for example with the lidar sensor and/or with other components in a larger device or robot. Particularly, the computing device is adapted for executing or controlling the method proposed herein. Accordingly, by operating the computing device, the estimated real dimensions of the elevator car may be determined.

Such computing device may be part of a maintenance arrangement according to an embodiment of the third aspect of the invention. Such maintenance arrangement may provide support in maintaining an elevator arrangement. For example, such maintenance arrangements may provide support in checking functionalities of the elevator arrangement.

For such purpose, the maintenance arrangement comprises a mapping robot as well as the proposed computing device. The mapping robot comprises a mobilization unit which allows to displace the robot within an environment. The mobilization unit may comprise one, two or more wheels which may be controllably driven by an actuator such as a motor. Using its mobilization unit, the robot may travel within an accessible space in the elevator arrangement. The mapping robot further comprises a lidar sensor. Using its lidar sensor, the robot may acquire a virtual 2-dimensional map of its surrounding.

Accordingly, the mapping robot may travel within an elevator arrangement and acquire a virtual 2-dimensional map of this elevator arrangement. Based on this virtual 2-dimensional map, the computing device may then determine the estimated real dimensions of the elevator car. Accordingly, the proposed maintenance arrangement may determine the estimated real dimensions of the elevator car preferably in a fully or at least partially automated manner.

In a further developed embodiment of the maintenance arrangement, the mapping robot or an optional maintenance robot comprising its own mobilization unit may be configured for executing a maintenance procedure within the elevator car. For example, the mapping robot or the maintenance robot may be configured for travelling throughout the elevator arrangement for activating and checking some of its functions. As specific examples, such robot may activate landing operation panels and/or a car operation panel, may detect deteriorations or pollutions within the elevator arrangement, may intentionally block elevator doors and check the elevator's reaction, etc. Therein, the robot may be configured for moving within the elevator car taking into account the estimated real dimensions of the elevator car as determined by the computing device.

Embodiments of the computer program product according to the fourth aspect of the invention comprise computer readable instructions which, when executed for example by the processor in the proposed computing unit, result in the proposed method being executed or controlled such that the estimated real dimensions of the elevator car are determined.

Such computer program products may be stored on a non-transitory computer readable medium according to an embodiment of the fifth aspect of the invention. Such computer readable medium may be any memory device which may store data in a permanent or non-permanent way. For example, the computer readable medium may be a flash memory, a CD, a DVD, a RAM or ROM, etc. Alternatively, the computer readable medium may be a computer, server or part of a data cloud from which the computer program product may be downloaded.

It shall be noted that possible features and advantages of embodiments of the invention are described herein partly with respect to a method and partly with respect to a device for determining estimated real dimensions of an elevator car or with respect to a maintenance arrangement implementing or using such approaches. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawings. However, neither the drawings nor the description shall be interpreted as limiting the invention.

The figures are only schematic and not to scale. Same reference signs refer to same or similar features.

DETAILED DESCRIPTION

Figure 1:
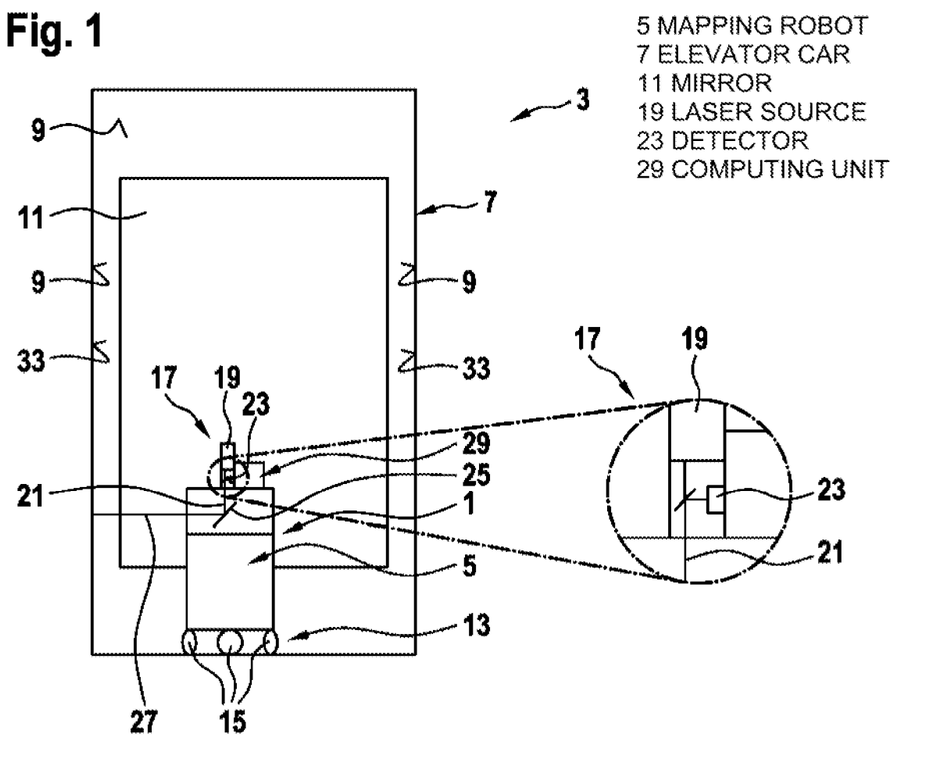
FIG. 1 shows a maintenance arrangement with a computing device for determining estimated real dimensions of an elevator car in accordance with an embodiment of the present invention.

FIG. 1 shows a maintenance arrangement 1 which may provide support in maintaining an elevator arrangement 3. The maintenance arrangement 1 comprises a mapping robot 5 which is located within an elevator car 7 of the elevator arrangement 3. In the example shown, the elevator car 7 comprises four walls 9 arranged at perpendicular angles with respect to each other such that the elevator car 7 has a rectangular horizontal cross-section. At least one of these walls 9 is partly covered by a mirror 11.

The mapping robot 5 comprises a mobilization unit 13. In the presented example, the mobilization unit 13 comprises several wheels 15 to be controllably driven. Accordingly, the mapping robot 5 may travel throughout the elevator car 7 and/or along adjacent floors in a building (not shown). Furthermore, the mapping robot 5 is configured for executing maintenance procedures within the elevator car 7 such as to for example test or check functionalities of the elevator arrangement 3.

The maintenance arrangement 3 further comprises a lidar system including a lidar sensor 17. The lidar sensor 17 comprises a laser source 19 for an emitting a laser beam 21 and a detector 23 for detecting reflections of the laser beam 21. Furthermore, the lidar system comprises a rotating mirror 25 for deflecting the laser beam 21 into a horizontal portion of the laser beam 27 being part of a horizontal detection plane. Upon emitting pulses of the laser beam 21 and detecting returning pulses upon being reflected at a target such as one of the walls 9 of the elevator car 7, the lidar sensor 17 may be used for preparing a virtual 2-dimensional map extending in the detection horizontal plane and representing reflection surfaces 33 corresponding to surfaces of the walls 9 of the elevator car 7.

The maintenance arrangement of 3 further comprises a computing unit 29. The computing unit 29 is configured for acquiring the virtual 2-dimensional map of the elevator car 7 based on data provided by the lidar sensor 17 and to determine the estimated real dimensions of the elevator car 7 using such virtual 2-dimensional map.

Figure 2:
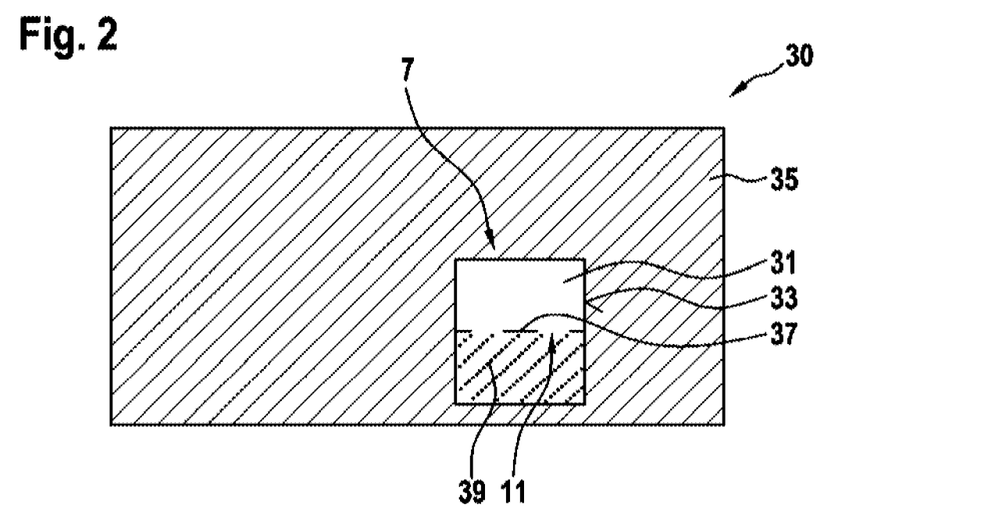
FIG. 2 represents an example of a virtual 2-dimensional map of an elevator car provided by a lidar sensor for use in a method according to an embodiment of the present invention.

FIG. 2 shows an example of a virtual 2-dimensional map 30 including a representation of an elevator car 7. Therein, a white or blank portion 31 in the map 30 represents areas which virtually appear to be accessible by the laser beam 21, 27 of the lidar sensor 17. This white portion 31 is enclosed in a black line representing reflection surfaces 33 from which the laser beam 21, 27 is reflected. Outside the reflection surfaces 33, there is a hatched area 35 which is not accessible by the laser beam 21, 27.

Within the white portion 31 virtually representing the accessible area of the elevator car 7, there appear to be some linear structures 37. In fact, these linear structures 37 represent non-mirroring portions of one of the walls 9 adjacent to one or more mirrors 11 covering other portions of the wall 9 of the elevator car 7. Accordingly, these linear structures 37 indicate real positions of the wall 9 whereas the portion 39 with the dotted hatching is only virtually accessible and in reality represents a part of the white portion 31 being represented without dotted hatching upon its reflection in one of the mirrors 11.

Accordingly, in the example shown in FIG. 2, only the upper part of the white portion 31, i.e. the part without the dotted hatching, corresponds to the real dimensions of the elevator car 7, whereas the lower part with the dotted hatching is virtual only and corresponds to a reflection of the upper part.

Steps of exemplary embodiments of the method for determining the estimated real dimensions of an elevator car 7 will now be described with reference to FIGS. 3(a)-(c) and 4(a)-(f).

Figure 3:
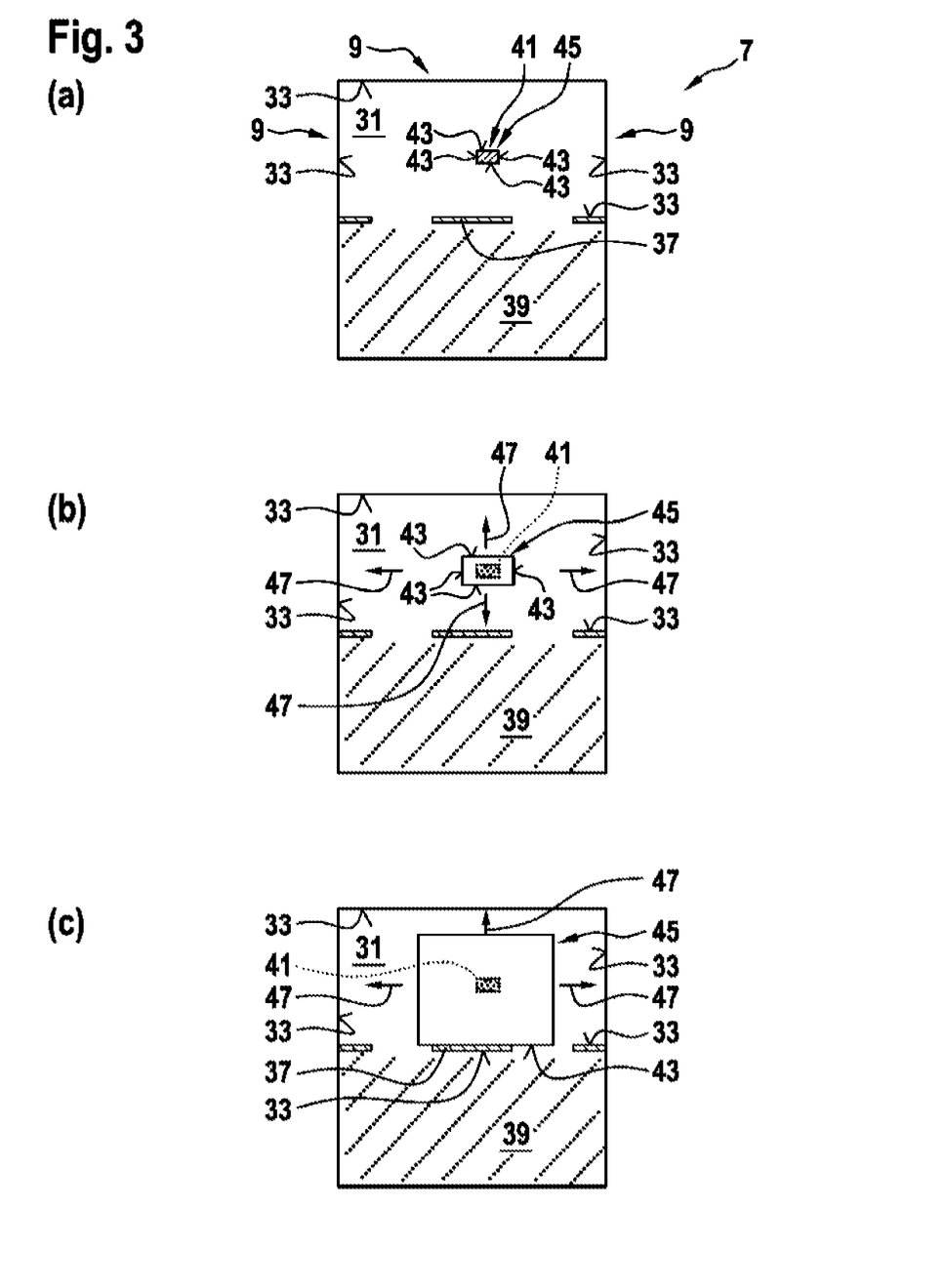
FIGS. 3(a)-(c) depict steps of a method according to an embodiment of the present invention.

As a first step, shown in FIG. 3(a), a starting area 41 is defined. The starting area 41 forms a rectangular area 45 and shall be located within the real dimensions of the elevator car 7. In order to know where these real dimensions roughly are, additional information acquired from prior knowledge data may be used. For example, there may be a map or plan showing a layout or footprint of the entire building including its elevator arrangement 3, from which the rough position of the elevator car 7 may be derived such that the starting area 41 may be positioned with regard to this location. The starting area 41 may be a single pixel of the virtual 2-dimensional map 30. The rectangular starting area 41 is arranged such that each of its edges 43 is parallel with respect to one of the walls 9 of the elevator car 7.

In a next step, shown in FIG. 3(b), the starting area 41 forming the rectangular area 45 is extended by one pixel in each of four extension directions 47. Thereby, a larger rectangular area 45 is formed and, compared to the starting area 41, the edges 43 of this larger rectangular area 45 are displaced towards the walls 9 of the elevator car 7.

This process of extending the rectangular area 45 by one pixel in each extension direction 47 is repeated until one of the pixels extended in such manner corresponds to one of the reflection surfaces 33, i.e. the location of the pixel overlaps with the location of the reflection surface 33. Such situation is represented in FIG. 3(c), where the lower edge 43 of the rectangular area 45 coincides with the reflection surface 33 created by one of the linear structures 37 representing non-mirroring wall portions, after having been extended several times in the downward extension direction 47. The extending of the rectangular area 45 in this downward extension direction 47 is then stopped.

However, in each of the remaining extension directions 47, the rectangular area 45 is further extended in successive steps until the entire white portion 31 representing the real accessible area is completely filled-out with the rectangular area 45.

At that stage, the rectangular area 45 is fully extended to a maximum and may be taken as representing the estimated real dimensions of the elevator car 7.

FIGS. 4(a)-(f) show an example in which the starting area 41 is originally not set at a suitable position. Instead, the starting area 41 is set at a position being too close to one of the mirrors 11 the elevator car 7.

Figure 4:
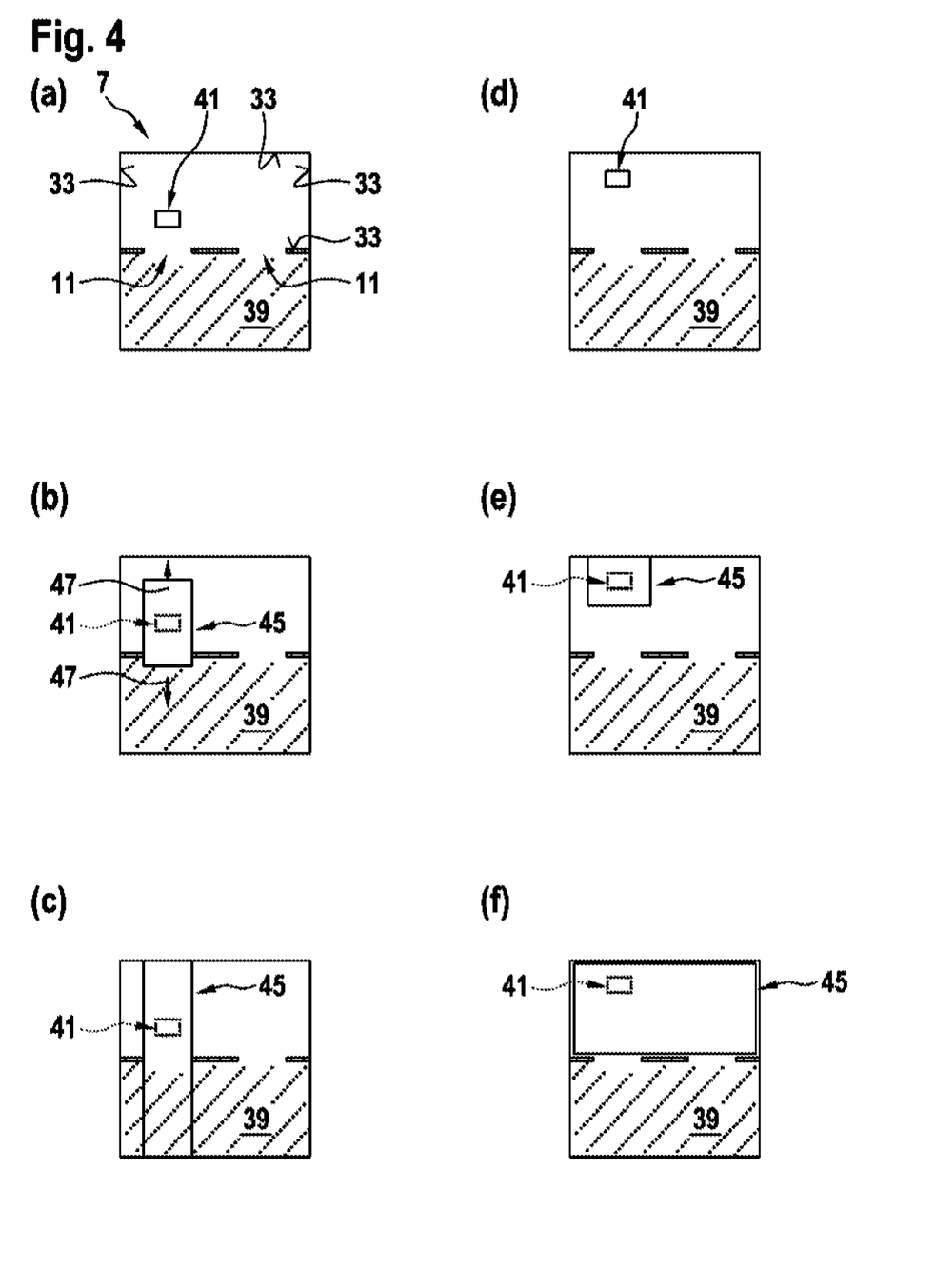
FIGS. 4(a)-(f) depict steps of a method according to an alternative embodiment of the present invention.

Accordingly, as shown in the sequence of FIGS. 4(a)-(c), upon successively extending the rectangular area 45, the rectangular area 45 enters the only virtually accessible area 39 "behind" the mirror 11. Apparently, as shown in FIG. 4(c), the fully extended rectangular area 45 does finally not correspond to the real dimensions of the elevator car 7.

In order to reduce the risk of obtaining such erroneous results, the method steps of defining the starting area 41 and then successively extending the rectangular area 45 may be repeated in several iterations. Therein, in each of the iterations, the starting area 41 may be set at another position.

Particularly, as represented in the sequence of FIGS. 4(d)-(f), in a second iteration, the starting area 41 may be set within the fully extended rectangular area 45 determined in the preceding first iteration. Starting at such alternative position, the rectangular area 45 may then be successively extended until the fully extended rectangular area 45 correctly fills the entire real dimensions of the elevator car 7.

Finally, it should be noted that the term "comprising" does not exclude other elements or steps and the "a" or "an" does not exclude a plurality. Also, elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for determining estimated real dimensions inside an elevator car, the method comprising the steps of:
   (a) acquiring a virtual 2-dimensional map of an accessible area inside the elevator car based on data provided by a lidar sensor, the virtual 2-dimensional map representing reflection surfaces from which laser light emitted by the lidar sensor is reflected;
   (b) defining a starting area as a rectangular area at a position located within real dimensions of the accessible area of the elevator car;
   (c) successively extending the rectangular area by one pixel in each of four extension directions orthogonal to edges of the rectangular area and including, when any pixel in one of the extension directions corresponds to one of the reflection surfaces in the virtual 2-dimensional map, stopping extending the rectangular area in the one extension direction, and wherein the rectangular area is fully extended when any pixel in each of the extension directions corresponds to an associated one of the reflection surfaces; and
   (d) determining the fully extended rectangular area as an estimated real dimensions inside the elevator car.

2. The method according to claim 1 including defining the starting area based on prior knowledge data indicating additional information about real dimensions of the elevator car.

3. The method according to claim 1 including defining the starting area position at or adjacent to a geometric center of the elevator car.

4. The method according to claim 1 including defining the starting area with edges of the rectangular area being parallel to walls inside the elevator car forming the accessible area.

5. The method according to claim 1 including repeating the steps (b) and (c) in iterations with redefining the starting area in each of the steps (b) at various different positions located within the real dimensions of the elevator car.

6. The method according to claim 5 including, in each subsequent one of the iterations after a first of the iterations, defining the starting area at a position located within the fully extended rectangular area determined in the first iteration.

7. The method according to claim 5 including when all of the iterations result in a same fully extended rectangular area, providing the fully extended rectangular area as the estimated real dimensions inside the elevator car.

8. The method according to claim 5 including when the iterations result in differing fully extended rectangular areas, selecting a most-likely solution among the differing fully extended rectangular areas taking into account additional prior knowledge indicating additional information about real dimensions inside the elevator car and determining the most-likely solution as the estimated real dimensions inside the elevator car.

9. The method according to claim 5 including disregarding each determined fully extended rectangular area not including the starting area defined in a first of the iterations upon the determining the estimated real dimensions inside the elevator car.

10. A computing device for determining estimated real dimensions inside an elevator car, the computer device comprising a computing unit configured for at least one of one executing and controlling the method according to claim 1.

11. A maintenance arrangement for providing support in maintaining an elevator arrangement, the maintenance arrangement comprising:
    a mapping robot having a mobilization unit and a lidar sensor, the mapping robot adapted to travel along an accessible space in the elevator arrangement driven by the mobilization unit and for acquiring a virtual 2-dimensional map of a surrounding of the mapping robot using the lidar sensor;
    a computing device according to claim 10; and
    wherein the computing device determines the estimated real dimensions of an elevator car of the elevator arrangement based on the virtual 2-dimensional map of the accessible space acquired with the lidar sensor of the mapping robot.

12. The maintenance arrangement according to claim 11 wherein at least one of the mapping robot and a maintenance robot, the maintenance robot having a mobilization unit, is configured for executing a maintenance procedure within the elevator car, and wherein the at least one of the mapping robot and the maintenance robot is adapted to move within the elevator car based on the determined estimated real dimensions inside the elevator car.

13. A computer program product comprising non-transitory computer readable instructions instructing a processor for at least one of executing and controlling the method according to claim 1.

14. A non-transitory computer readable medium having stored thereon the computer program product according to claim 13.

* * * * *